INVENTOR.
ALTON O. CHRISTENSEN
BY
John D. Graham
ATTORNEY

United States Patent [15] 3,691,402
Christensen [45] Sept. 12, 1972

[54] FREQUENCY DIVIDER CIRCUIT

[72] Inventor: Alton O. Christensen, Houston, Tex. 77036

[73] Assignee: Shell Oil Company, New York, N.Y.

[22] Filed: April 29, 1971

[21] Appl. No.: 138,416

[52] U.S. Cl. ....307/225 C, 307/279
[51] Int. Cl. ....H03k 21/00, H03k 23/08
[58] Field of Search ....307/205, 225, 279, 304

[56] References Cited

UNITED STATES PATENTS

| | | | |
|---|---|---|---|
| 3,383,570 | 5/1968 | Lüscher | 307/279 X |
| 3,555,307 | 1/1971 | Hujita | 307/225 C |

*Primary Examiner*—John Zazworksy
*Attorney*—John G. Graham and Harold L. Denkler

[57] ABSTRACT

A clockless FARMOST toggle flip-flop circuit is combined with a pair of ratioed inverters, a clock supply, and a DC power supply to form a simple, low-power frequency divider.

6 Claims, 2 Drawing Figures

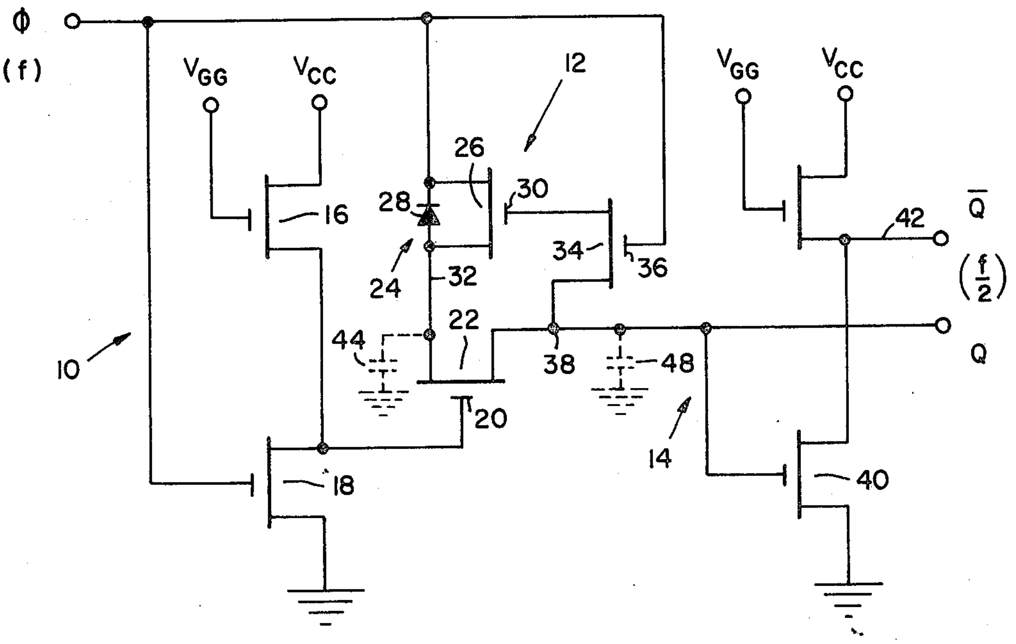

FREQUENCY DIVIDER CIRCUIT

BACKGROUND OF THE INVENTION

The copending application Ser. No. 22,194 filed Mar. 24, 1970 and entitled CLOCKLESS FARMOST TOGGLE FLIP-FLOP CIRCUIT discloses a ratioless and clockless toggle flip-flop circuit of very simple design using a FARMOST (Fast Acting Ratioless Metal Oxide Silicon Transistor) inverter coupled with two IGFETs (Insulated Gate Field Effect Transistors) and two storage capacitors. Although the primary advantage of the circuit of the aforementioned copending application, other than the saving in space which it provides, is derived mostly from its ratioless operation, it is possible, by foregoing the ratioless feature, to convert the flip-flop circuit of the aforementioned copending application to a frequency divider circuit.

SUMMARY OF THE INVENTION

The present invention provides an extremely simple frequency divider circuit having low power requirements and few components by combining a clockless FARMOST toggle flip-flop circuit of the type described in the aforementioned copending application with a pair of ratioed inverters, a clock supply, and a DC power supply. The output of the frequency divider can be either a straight frequency-divided signal, an inverted frequency-divided signal, or both.

It is the object of the invention to provide a simple frequency-divider circuit having low power consumption and a minimum of component parts.

DESCRIPTION OF THE PREFERRED EMBODIMENT

Figure 1:
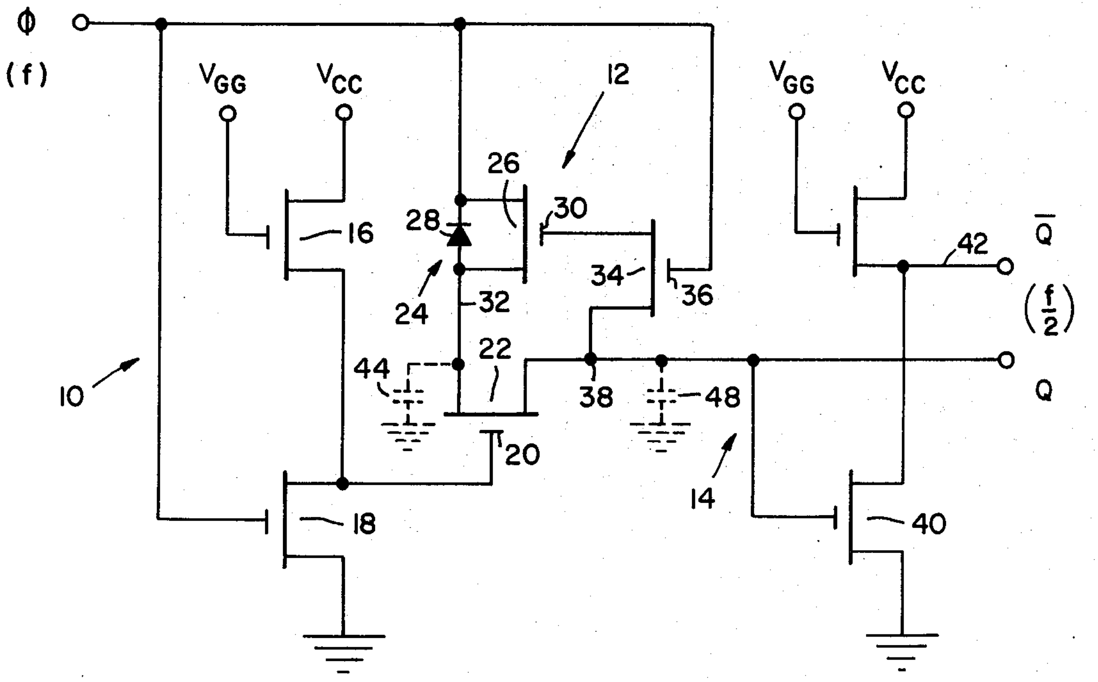
FIG. 1 is a circuit diagram illustrating the frequency divider of this invention.

As shown in FIG. 1, the circuit of this invention consists of three major parts: the ratioed inverter 10, the ratioless toggle flip-flop 12, and the optional ratioed inverter 14. The ratioed inverter 10 consists of a pair of series-connected IGFETs 16, 18. The gate electrode of IGFET 16 is connected to a DC supply $V_{GG}$ which keeps IGFET 16 permanently enabled.

The gate supply $V_{GG}$ is shown in FIG. 1 as separate from the source-drain supply $V_{CC}$. The reason for this arrangement is to permit overriding the back gate bias effect of IGFET 16 during the charge period to obtain faster operation. For this purpose, it is desirable to make $V_{GG}$ substantially higher than $V_{CC}$. For example, $V_{GG}$ may be in the range of 24–28 V, while $V_{CC}$ may be in the range of 12–15 V. It will be understood, of course, that in applications where the use of fewer supply voltages is more important than maximum speed of operation, $V_{GG}$ and $V_{CC}$ may be made the same.

A clock signal $\phi$ consisting of pulses having a repetition rate or frequency $f$ is applied to the gate electrode of the ratioed inverter IGFET 18. IGFETs 16 and 18 are designed, in accordance with conventional design techniques, in such a manner that the "on" resistance of IGFET 16 is considerably greater than the "on" resistance of IGFET 18, preferably by an order of magnitude. Consequently, in the presence of the clock pulse $\phi$, the gate electrode 20 of switching IGFET 22 will be essentially at ground, whereas the gate electrode 20 will be at the DC potential $V_{CC}$ whenever the clock pulse $\phi$ is absent.

The clock pulse $\phi$ is also applied to the clock input side of a FARMOST inverter 24, which consists of an input IGFET 26 and a diode 28. The diode 28 is preferably a barrier-type diode such as a Schottky diode, but it will be understood that where speed of operation is not a primary consideration, it may also be a diode-connected IGFET in accordance with conventional FARMOST inverter construction techniques.

The gate electrode 30 of the inverter IGFET 26 of FARMOST inverter 24 and the output side 32 of the FARMOST inverter 24 are bridged by a pair of series-connected switching IGFETs 22, 34. The gate electrode 36 of switching IGFET 34 is also connected to the clock supply $\phi$. The output of the FARMOST inverter circuit 12 is taken at the junction 38 of the source-drain circuits of switching IGFETs 22, 34.

If it is desired to produce a double-rail frequency-divided output, the FARMOST inverter circuit output from junction 38 may be connected to the gate electrode of IGFET 40 of a second ratioed inverter 14, whose operation and construction is identical to that of ratioed inverter 10. As explained in connection with ratioed inverter 10, the output $\overline{Q}$ on line 42 of ratioed inverter 14 will be the complement of the frequency-divided clock output Q taken from junction 38.

The operation of the circuit is as follows: During the first clock pulse $\phi$, a charge corresponding to the clock voltage V is imparted to the line capacitance 44 through diode 28. Upon the cessation of the first clock pulse, switching IGFET 22 becomes enabled, and the charge on line capacitance 44 is transferred to the capacitance represented by the sum of line capacitance 48 and the gate electrode capacitance of IGFET 40. It is desirable to make the gate potential of IGFET 22 as high as possible, so as to obtain the maximum possible voltage transfer.

At the next clock pulse $\phi$, the enabling of switching IGFET 34 transfers some of the charge of line capacitance 48 to the much smaller gate electrode capacitance of FARMOST inverter input IGFET 26. At the cessation of second clock pulse, the enabling of switching IGFET 22 dissipates the charge on line capacitance 48 and the gate capacitance of IGFET 40 through the source-drain circuit of switching IGFET 22 and of the now-enabled input IGFET 26. At the third clock pulse $\phi$, the charge on the gate electrode of inverter input IGFET 26 is dissipated into the now discharged line capacitance 48 through switching IGFET 34, and the cycle repeats. It will be seen that the wave form of the output Q taken at junction 38 and $\overline{Q}$ taken from ratioed inverter 14 are the wave forms shown in FIG. 2.

Figure 2:
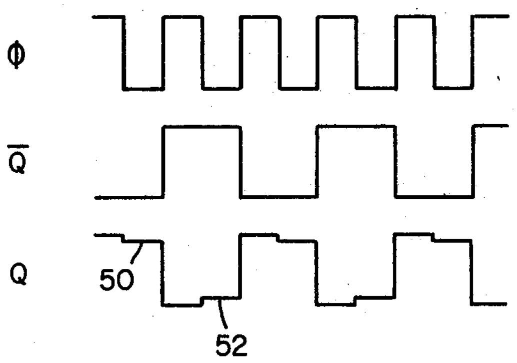
FIG. 2 is a time-amplitude diagram of the wave forms involved in the operation of the circuit of FIG. 1.

Depressions 50, 52 in the waveform Q of FIG. 2 are due respectively, to the transfer of some of the charge on capacitance 48 to the gate capacitance of IGFET 26, and to the dissipation of the charge on the gate capacitance of IGFET 26 into capacitance 48. No such depressions appear in the waveform of $\overline{Q}$ because the potential in line 42 is substantially unaffected by small variations in the potential of Q. The $\overline{Q}$ output not only squares the logic level, but also restores any logic level losses which may have occurred in the circuit. It can also stand higher loading due to its smaller output impedance.

It will be noted that the use of a ratioed inverter 10 in the circuit of this invention is mandatory, and that although ratioed inverters are less efficient and reduce the speed of operation, they cannot be replaced by FARMOST inverters. This is due to the fact that a ratioed inverter provides true inversion at all times, whereas a FARMOST inverter produces a false indication during the precharge portion of its cycle. (i.e., its output during the precharge portion of its cycle is always "1, " regardless of the input). Such a false indication is not compatible with the functioning of the circuit of this invention.

As previously mentioned, it is essential for a proper voltage transfer between line capacitances 44 and 48 in both directions that the gate voltage on switching IGFET 22 be as high as possible. In practice, to avoid a loss of logic level between the input and output of the circuit which would preclude connecting a plurality of these circuits in series (as in a count-down chain), and the voltage $V_{CC}$ should be at least equal to, and preferably much greater than, the clock level $\phi$.

Consequently, and considering further the comments made hereinabove regarding the relation of $V_{CC}$ and $V_{GG}$, it would not be practical, even though technically possible, to omit the $V_{CC}$ and $V_{GG}$ supplies and to drive the entire circuit with the $\phi$ input.

What is claimed is:

1. A frequency divider circuit, comprising:

a. a source of clock pulses having a first frequency;

b. ratioless IGFET inverter means including IGFET means and unidirectionally conductive means connected in parallel with the source-drain circuit of said IGFET means, said source-drain circuit forming the output side of said inverter means;

c. a pair of switching IGFETS having their source-drain circuits connected in series between the gate electrode of said inverter IGFET means and the output side of said inverter means;

d. ratioed inverter means having an input connected to said source of clock pulses and an output connected to the gate electrode of one of said pair of switching IGFETS; and e. circuits output means connected to the junction of the series-connected source-drain circuits of said pair of switching IGFETS;

f. the gate electrode of the other of said pair of switching IGFETS being connected to said source of clock pulses; and g. capacitance means formed between the output side of said ratioless inverter means and a point of fixed potential, and between said circuit output means and said point of fixed potential.

2. The circuit of claim 1, in which said capacitance means include the line capacitances of the output side of said ratioless inverter means and of said circuit output means.

3. The circuit of claim 1, further comprising second ratioed inverter means having an input connected to said circuit output means, the output of said second ratioed inverter means being a low-impedance complement of said circuit output means.

4. The circuit of claim 1, in which said unidirectionally conductive means is a barrier diode.

5. The circuit of claim 1, in which the supply voltage of said ratioed inverter means is greater than the voltage of said clock pulses.

6. The circuit of claim 1, in which said ratioed inverter means includes a permanently enabled IGFET, the gate of said permanently enabled IGFET being coupled to a voltage of substantially greater amplitude than the voltage coupled to the source-drain circuit of said permanently enabled IGFET, both of said voltages being greater than the voltage of said clock pulses.

* * * * *